United States Patent [19]

Viaud et al.

[11] Patent Number: 5,025,718
[45] Date of Patent: Jun. 25, 1991

[54] MACHINE FOR FORMING CYLINDRICAL BALES OF CROP

[75] Inventors: Jean Viaud, Sarrequemines; Arsène Roth, Walschbronn, both of France; Henry D. Anstey, Ottumwa, Iowa

[73] Assignee: Deere & Company, Moline, Ill.

[21] Appl. No.: 524,539

[22] Filed: May 17, 1990

[30] Foreign Application Priority Data

Jun. 8, 1989 [GB] United Kingdom ............... 8013245

[51] Int. Cl.⁵ ............................................. B30B 5/06
[52] U.S. Cl. ...................................... 100/88; 56/341; 100/87
[58] Field of Search .................... 100/5, 87, 88, 89; 56/341–343

[56] References Cited

U.S. PATENT DOCUMENTS

| | | | |
|---|---|---|---|
| 3,722,197 | 3/1973 | Vermeer | 100/88 X |
| 4,072,096 | 2/1978 | Phillips | 100/88 X |
| 4,257,219 | 3/1981 | Burrough et al. | 100/88 X |
| 4,391,187 | 7/1983 | Koning et al. | |
| 4,393,764 | 7/1983 | Viaud | 100/88 |
| 4,433,619 | 2/1984 | Anstey et al. | 100/88 X |
| 4,545,298 | 10/1985 | Viaud | 100/88 |

FOREIGN PATENT DOCUMENTS

| | | | |
|---|---|---|---|
| 981915 | 1/1976 | Canada | 56/341 |
| 0234634 | 9/1987 | European Pat. Off. | |
| 2604855 | 4/1988 | France | 100/87 |

Primary Examiner—Harvey C. Hornsby
Assistant Examiner—Stephen F. Gerrity

[57] ABSTRACT

A large round baler having an expansible bale chamber has tension cylinders associated with the chamber for strongly resisting expansion thereof so as to produce dense bales when a bypass valve located in a bypass line interconnecting rod and piston ends of the tension cylinders is positioned for preventing flow through the valve thereby forcing the flow to go through a variable high pressure relief valve located in another bypass line, the bypass valve being selectively shiftable to another position for permitting free flow therethrough when it is desired to produce a soft bale. The baler also includes gate cylinders for opening and closing the discharge gate of the baler. These gate cylinders are connected in circuit with the tension cylinders and the bypass valve is connected to the piston ends of the gate cylinders in such a way as to prevent the gate cylinders from extending at a time when the gate has just been closed, such extension of the gate cylinders, if not prevented, resulting in the gate becoming unlatched.

15 Claims, 3 Drawing Sheets 5,025,718

MACHINE FOR FORMING CYLINDRICAL BALES OF CROP

BACKGROUND OF THE INVENTION

This invention relates to a machine for forming cylindrical bales of crop and more particularly relates to such a machine for making bales which are of low density or "soft".

Machines, towed by a tractor, for forming large cylindrical bales of hay (so-called "round balers") are well known. As the machine advances, the crop is removed from a windrow by a pick-up mechanism and delivered rearwardly to a baling chamber where it is rolled round upon itself into a bale.

In one form of such a machine, the baling chamber is defined by runs of belts which move outwardly to enlarge the chamber so as to accommodate the bale as it grows in size. The belts are trained over rolls connected to a drive. A pair of rolls is located at the top of the chamber and these rolls are carried by a swingable tension arm on either side of the machine enabling the two rolls to swing upwardly as the girth of the bale increases. The tension arms are connected to hydraulic piston and cylinder units, i.e., tension cylinders, which resist their upward movement sufficiently to ensure that a dense bale is formed. Hydraulic piston and cylinder units are used to raise a rear gate of the machine to release a completed bale and these units, i. e., gate cylinders, are connected to the tension cylinders.

In most circumstances, a uniformly dense bale is highly desirable. However, in some conditions, it is useful for the core (or indeed the entire bale) to be of low density or soft. Such conditions occur, for example, when the crop has to be baled wet, and hot air is subsequently blown through the completed bale to reduce the excess moisture. This treatment is obviously more effective with a looser bale. Certain special applications also make a softer bale more desirable, e.g., a machine for grinding straw prior to its use in mushroom growing beds will more readily accept this type of bale.

The hydraulic circuitry involving the tension cylinders which brake the tension arms as referred to above includes first and second supply/return lines from quick couplers, connected to the hydraulic supply of the tractor towing the baler, to the rod ends and piston ends respectively of the cylinders. Pressure in the rod ends resists extension of the cylinders and therefore affords the braking effect on the tension arms. Thus, control of this pressure provides control of the density of the bale.

In the known Model 550 Round Baler, produced and marketed by Deere & Company, the pressure is controlled as follows. A check valve is disposed in the first supply/return line running from one of the couplers to the rod ends, and allows flow in the direction of the rod ends. The rod and piston ends are connected by a bypass line interconnecting the first and second supply/return lines which respectively run to the rod and piston ends, with the bypass line being connected to the first supply/return line at a point downstream of the check valve. Located in the bypass line is an adjustable bale density relief valve. The setting for the opening of this latter valve, typically at 180 bars, determines the pressure at which the rod ends are relieved and hence the density of the bale being formed. U.S. Pat. No. 4,391,187 granted to Koning et al. on 5 July 1983 discloses and describes a tensioning system substantially similar to that embodied in the Model 550 Round Baler.

It is desirable to be able to minimize the pressure in the rod ends to produce softer bales (or cores) when needed, and yet maintain the capability of the machine to make dense bales. A simple way of achieving this has been proposed in which a valve is disposed in a line between the rod and piston ends of the tension cylinders and is selectively shiftable between an open position connecting the opposite ends of the tension cylinders to each other for effecting formation of a bale having a soft core and a closed position enabling pressure to be maintained in the rod ends for dense baling. However, the hydraulic circuitry connecting the tension cylinders and gate cylinders is such in, for example, the afore-mentioned Model 550 Round Baler (as will be explained later in detail) that, after closing the gate following release of a completed bale through the raised gate, hydraulic fluid is trapped under pressure in the rod ends of the tension and gate cylinders. This fluid flows to the piston ends to equalize the pressure at the rod and piston ends, but nevertheless, due to difference in surface areas at the ends, the gate cylinders tend toward unwanted creeping extension and thereby release latches which keep the gate closed with the result that baling cannot start until the latches have again been secured.

SUMMARY OF THE INVENTION

According to the present invention, there is provided a machine for forming low density or soft cylindrical bales and, more particularly, there is provided such a machine which overcomes the aforementioned difficulties associated with the prior art machine.

An object of the invention is to provide a machine for forming cylindrical bales of crop which includes a hydraulic system incorporating a two-way tension cylinder for resisting the expansion of an expansible bale chamber, a two-way gate cylinder for selectively retaining a gate latch in its latched position and for moving a discharge gate of the machine between open and closed positions; and a bypass valve means operable between a normal home position, wherein it prevents flow between rod and piston ends of the tension cylinder, except by way of an adjustable high pressure relief valve connected in parallel with the bypass valve means, while permitting free flow to and from the piston end of the gate cylinder, and an actuated position wherein it permits free flow between the rod and piston ends of the tension cylinder while stopping flow to the piston end of the gate cylinder, whereby a dense bale is formed when the bypass valve is in its normal position and a soft bale is formed and the gate cylinder is prevented from creeping when the bypass valve is in its actuated position.

A more specific object of the invention is to provide a machine, as described in the previous object, wherein the valve means is solenoid operated and when energized places the valve in its actuated position and when de-energized permits the valve to assume its home position and wherein the coil of the solenoid valve is connected in an electrical circuit including a bale size switch located so as to be opened for de-energizing the solenoid when a bale core is formed to a preselected size within the bale chamber.

These and other objects will become apparent from a reading of the ensuing specification together with the appended drawings.

DESCRIPTION OF THE PREFERRED EMBODIMENT

Figure 1:
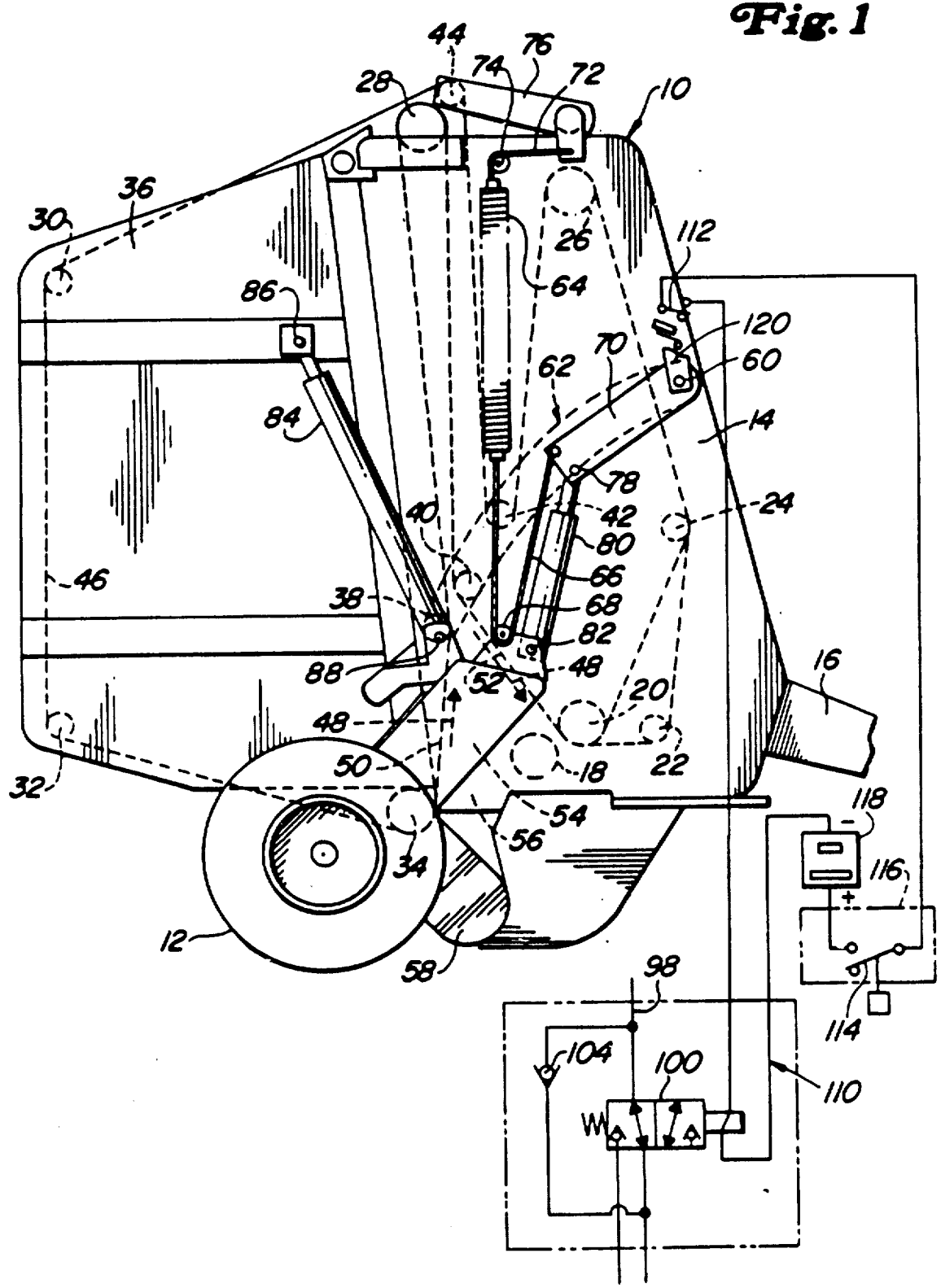
FIG. 1 is a diagrammatic, right side elevational view of a machine for forming large cylindrical bales of crop material showing certain details only and having an electrical circuit superimposed thereon.

In FIG. 1, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extend over the width of the machine. One set of rolls 18, 20, 22, 24, 26, 28 is journalled in the side walls 14, while another set consisting of rolls 30, 32, 34 is journalled in a swingable gate 36. There is also a pair of chamber restricting rolls 38, 40 and two belt take-up rolls 42, 44.

Six rubber belts 46 are trained side-by-side over the rolls, with the exception of the roll 18 which acts as a stripper roll, to provide the configuration shown and they move in the direction indicated by arrows 48, the stripper roll 18 being driven anti-clockwise as viewed in FIG. 1. However, alternate belts only are trained over the lower foremost roll 22, while the remaining belts by-pass this roll, to provide a staggered array which is of no significance in relation to the present invention but which is described in U.S. Pat. No. 4,399,746, granted 23 Aug. 1983. Upwardly extending runs 50, 52 of the belts 46 define a bale-forming chamber 54, the ends of which are provided by the side walls 14 and gate 36 and which has an inlet 56 for crop received from a pick-up 58 beneath it.

In order to accommodate the increasing diameter of a growing bale core in the bale-forming chamber 54, the size of the chamber must also increase and a belt take-up and tensioning mechanism is provided at either side of the machine. These mechanisms include: a pair of rearwardly extending tension arms which are mounted rigidly at the forward end of the main frame 10 on a horizontal transverse shaft 60, providing a pivot connection for the arms, and of which the right hand arm 62 only is shown; the belt take-up roll 42 which is supported at either end at an intermediate location on the arms 62; and the pair of chamber restricting rolls 38, 40 supported at the free ends of the arms. The arms are biased in an anti-clockwise direction (in FIG. 1) by a pair of springs, one on either side of the main frame 10, of which only the right hand spring 64 is shown and only its arrangement will be described, the other being similar. The spring 64 is connected at its lower end by a cable 66 which runs over a pulley 68 to a lever portion 70 of the arm 62, the portion 70 being rigid with the pivot shaft 60, and at its upper end by a cable 72 via a pulley 74 to one arm of a bell crank 76 the other arm of which bears one end of the take-up roll 44. The free end of the lever portion 70 is pivotally connected at a point 78 to the piston rod of a piston and cylinder unit or 80, loading the arm 62, of which the cylinder is in turn pivotally connected to the frame 1 at a point 82, a similar arrangement being provided also on the left hand side of the machine.

A further piston and cylinder unit 84 (on either side of the machine) is connected between pivot points 86, 88 on the gate 36 and main frame 10 for opening and closing the gate. For convenience the units 84 will be referred to as gate cylinders 84, and the units 80 as tension cylinders 80.

Figure 2:
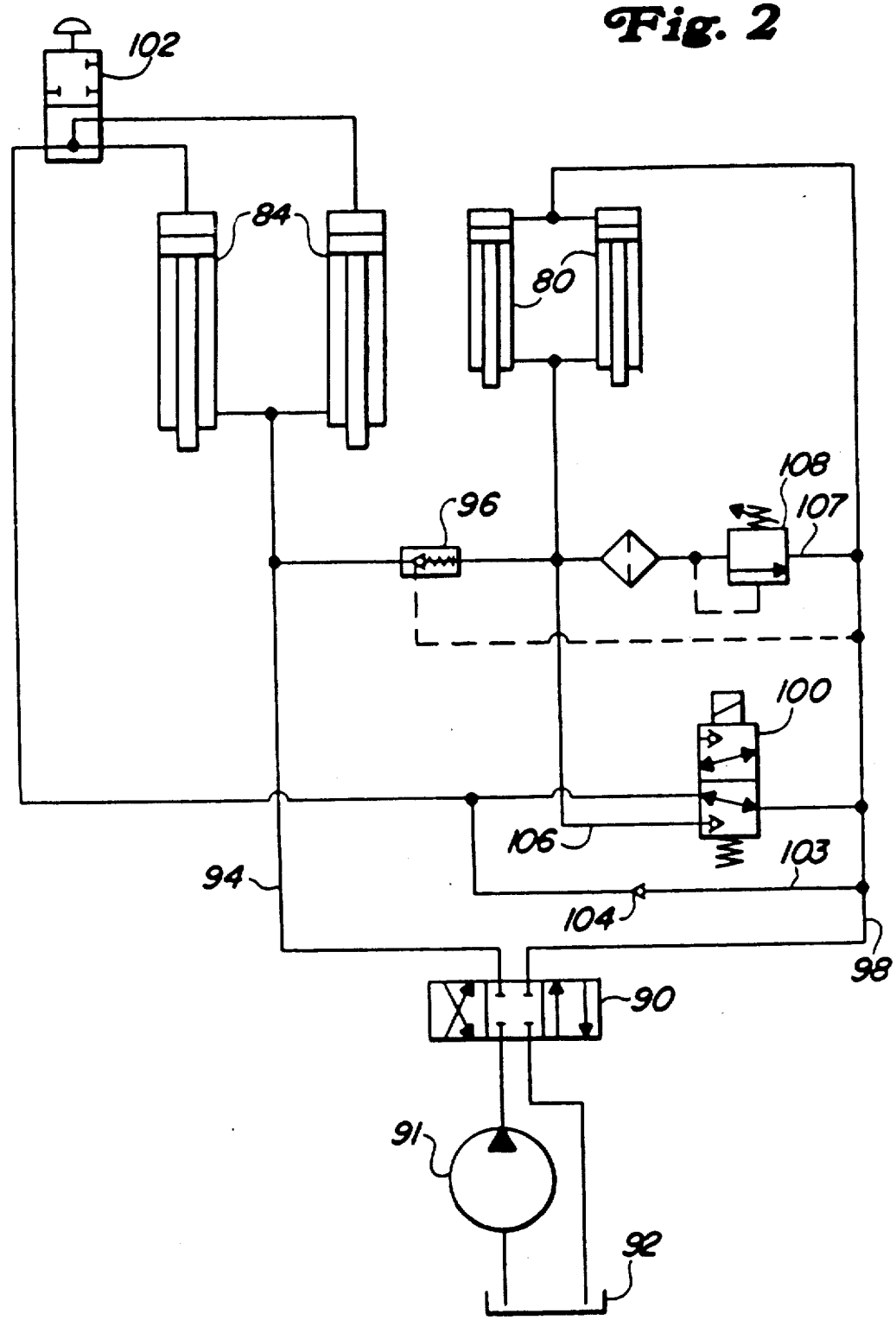
FIG. 2 is a diagram of a hydraulic circuit for the machine in FIG. 1.

The arrangement of the relevant hydraulic circuit will now be described. In FIG. 2, the hydraulic circuit is seen to include a direction control valve 90, a pump 91 and a sump 92 all of which would normally be found on a towing tractor. A first supply/return line 94 is connected to the direction control valve 90 and is branched with one part being connected directly to the rod ends of the gate cylinders 84 and with another part containing a check valve 96 and being connected to the rod ends of the tension cylinders 80. A second supply/return line 98 is connected to the direction control valve 90 and is branched with one branch being connected directly to the piston ends of the tension cylinders 80 and with another branch being connected to the piston ends of the gate cylinders 84 by way of a bypass valve 100 (in the form of a three-way, two-position, solenoid actuated valve) and a manually operable gate lock valve 102 that is connected in series with the valve 100. A shunt line 103 connects the supply/return line 98 to the piston ends of the gate cylinders 84 by a path which circumvents the bypass valve 100, the line 103 containing a one-way valve 104 which permits flow only in a direction away from the piston ends of the cylinders. The bypass valve 100 is also connected in a bypass line 106 which interconnects the supply/return lines 94 and 98 at a location for establishing a connection between the rod and piston ends of the tension cylinders 80 in parallel with the connection thereof through a second bypass line 107 containing an adjustable high pressure relief valve 108. The flow through the bypass line 106 is restricted to a low value relative to the rest of the hydraulic circuit by sizing the line 106 accordingly or by way of an orifice (not shown) in order to ensure an appropriately substantial pressure drop between the ends of the gate cylinders 84 during closure of the gate 36.

Control of the solenoid of the valve 100 is exercised through an electrical circuit 110 which is shown in FIG. 1 and in which: the solenoid (i.e. the solenoid winding) of the valve 100, an automatic bale size switch 112 adjacent the tension arm 62 on the baling machine, and a manual control switch 114 on a monitor box 116 in the driver's cab of the tractor are all disposed in series with an electrical source 118 on the tractor.

Thus, with both the switch 112 and the switch 114 closed, the solenoid of the valve 100 will be actuated to move the valve 100 to its position connecting the rod and piston ends of the tension cylinders 80, and if either one or both of the switches is (are) open the circuit to the solenoid is broken and the valve 100 will revert to its home position shown in FIG. 2 connecting the piston ends of the gate and tension cylinders 80, 84 to each other.

The switch 112 operates in dependence on the position of the tension arm 62 during its swing. In particular, a short trigger arm 120 which is rigid with the transverse shaft 60 and which therefore swings with the tension arm 62 opens the switch 112 from its "home" closed condition when the tension arm 62 has swung to the necessary predetermined angle. The trigger arm 120 and the switch 112 are relatively adjustable so that this angle can be varied according to the choice of the operator for the core size of the bale. The switch 114 in the monitor box 116 incorporates a signal light which is "on" when circuit 110 is made.

The operation of the hydraulic circuit will now be described.

The control valve 100 is shown with the solenoid not actuated in a position allowing fluid flow between the piston ends of the gate and tension cylinders 84, 80, the switch 114 being open. With the valve 100 in this position, flow between the rod and piston ends of the tension cylinders will be prevented except by way of the adjustable relief valve 108 and a dense bale will be formed. Specifically, the adjustable relief valve 108 is set, for example, at 180 bars at which pressure it will interconnect the rod and piston ends of the tension cylinders 80 with no return flow through the valve 96. In this manner, the tension cylinders 80 offer sufficiently high resistance to the upward swinging movement of the tension arms 62 and thus to the expansion of the bale chamber 54 for a dense bale to be formed.

If a soft core bale is required, then at the start of baling the solenoid of the valve 100 must be actuated to bring the valve into the position interconnecting the rod and piston ends of the tension cylinders 80. This is accomplished by the operator closing the switch 114 in his monitor 116. Thus, the tension cylinders 80 will not resist the movement of the tension arms 62 and a soft core will be baled.

At the chosen size of core, the tension arm 62 reaches the predetermined angle necessary for the trigger arm 120 to open the bale size switch 112, thus breaking circuit 110 which ceases to actuate the solenoid of the valve 100 causing the valve to revert to its normal home position preventing circuit flow between the rod and piston ends of the tension cylinders 80. With the valve in this position, control of the pressure in the rod ends of the tension cylinders 80 is again by way of the high pressure relief valve 108 and the density of the outer bale portion being produced is high.

Should the driver wish to produce a completely soft bale, the circuit 110 must be maintained as made during the entire operation. He therefore closes the control switch 114 initially as before, but adjusts the relative positions of the trigger arm 120 and the bale size switch 112 so that the arm cannot open the switch 112 throughout the entire period of formation of the complete bale.

The relationship of the positions of the valve 100 to the gate cylinders will now be described. With the valve 100 in its home (non-actuated) position, the connection between the rod and piston ends of the tension cylinders 80 is closed and the piston ends of the tension and gate cylinders 80, 84 are interconnected with the supply/return line 98. Most importantly, when the valve 100 is in its actuated position in which the rod and piston ends of the tension cylinders 80 are connected, flow through the valve 100 to the piston ends of the gate cylinders 84 is stopped although flow from the latter to the supply/return line 98 is still possible through the check valve 104.

Such an arrangement overcomes the following problem. If a valve is provided between the ends of the tension cylinders 80 merely to open in order to connect those ends or close to cut the connection, difficulties arise with the gate cylinders 84. When the gate 36 is closed by flow to the rod ends of the gate cylinders 84, as occasioned by shifting the control valve 90 to connect the pump 91 to line 94 after release from the baler of a completed bale, and as the valve 90 is brought to neutral, oil under pressure trapped in the rod side of the cylinders will continue to flow through this valve to the piston sides of the cylinders 80, 84. The pressure will equalize at both ends of these cylinders but this will cause the gate cylinders 84 to tend to extend. The tension cylinders 80 are not affected in the same way, since the tension arms 62 offer sufficient resistance to creeping extension. On the other hand, the only resistance to the initial extension of the gate cylinders 84 is provided by very easily opened gate latches. Thus, the gate 36 will tend to be released from these latches and in these circumstances baling will not then be possible.

Since, as mentioned above, when the present valve 100 connects the ends of the tension cylinders 80, flow to the piston ends of the gate cylinders 84 is nevertheless stopped and unwanted extension of these cylinders is avoided. It is also possible to close the gate 36 when the valve 100 is in its actuated position because fluid can flow, as also explained above, through the check valve 104 and the control valve 90, to the sump 92 on the tractor from the piston ends of the gate cylinders 84. Internal leakage of the valve 100 should be very low when it is in its home position to maintain pressure for high density baling.

Figure 3:
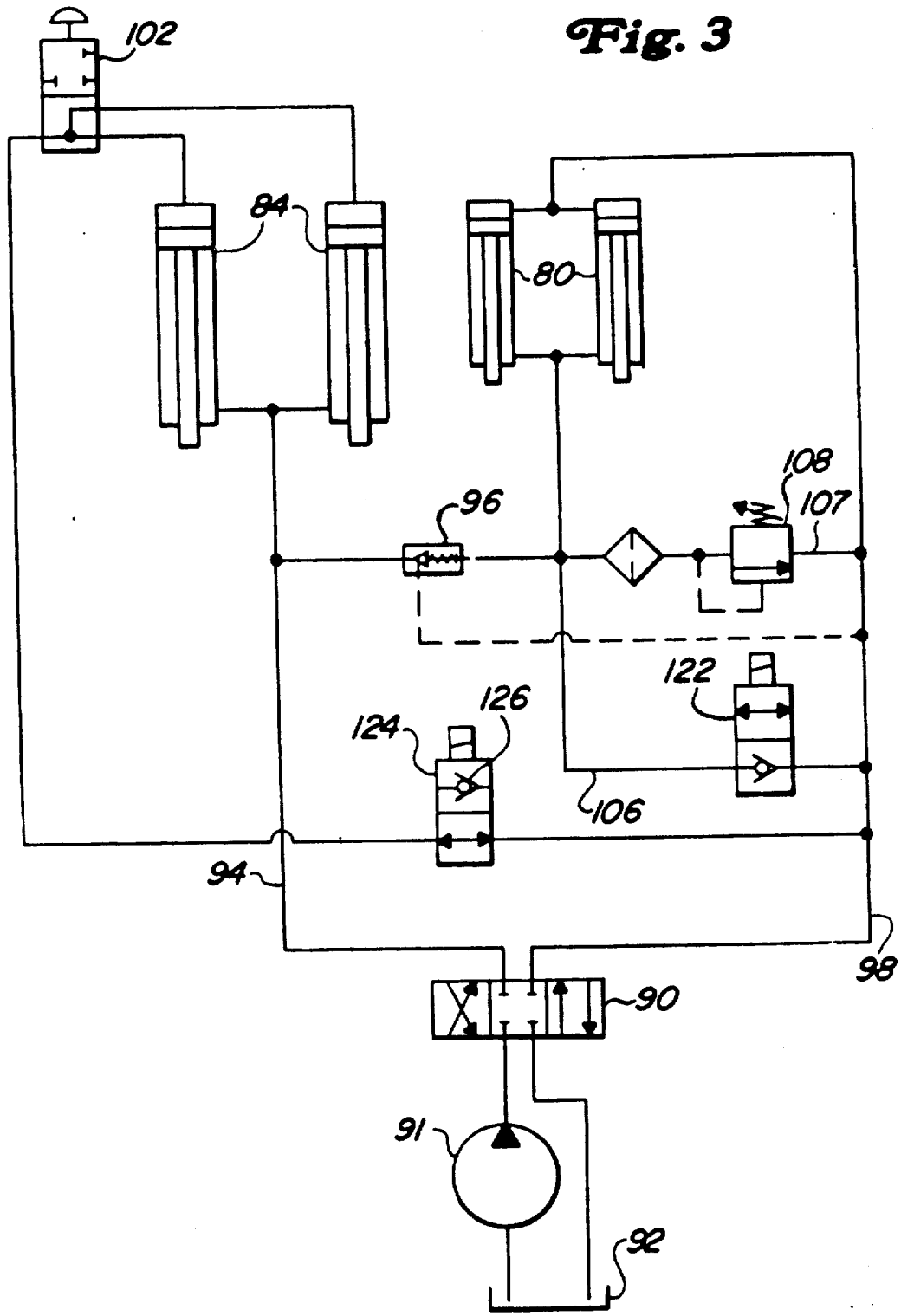
FIG. 3 is a diagram of a modified hydraulic circuit for the machine in FIG. 1.

Instead of using a single two-position by-pass valve 100 as in FIGS. 1 and 2, two two-way, two-position, solenoid actuated valves 122, 124 can be employed as shown in FIG. 3. The valve 122 which is normally closed is disposed between the ends of the tension cylinders 80, and the valve 124 which is normally open is between the piston ends of the tension cylinders 80 and the piston ends of the gate cylinders 84. The combined positions of the valves 122, 124 in FIG. 3 correspond to the home position of the valve 100 illustrated in FIG. 2, i.e. the solenoids of the valves 122, 124 are not actuated. Thus the valve 124 is in its free flow position, while the valve 122 cuts the connection between the ends of the tension cylinders 80. The valve 122 will be moved on actuation to a free flow position and the valve 124 to a position cutting flow to the piston ends of the gate cylinders 84 corresponding to the actuated position of the valve 100. A check valve 126 in FIG. 3 incorporated in the valve 124 corresponds to the check valve 104 in FIG. 2. Thus, the function of the valves 122, 124 taken together is the same as that of the valve 100.

We claim:

1. In a machine for forming cylindrical bales of crop having a variable volume baling chamber and a hydraulic system which includes a piston and cylinder unit which is arranged so that it can provide resistance to increase in the said volume and which is connectible to a source of pressurized hydraulic fluid, and a second piston and cylinder unit which is arranged so that it can move a component of the machine between two positions and which is connectible to the source, the improvement comprising: a first hydraulic line interconnecting rod and piston ends of the first unit; a second hydraulic line connected between the second unit and the first line; and valve means located in the first and second lines and being movable between a first position stopping flow between the opposite ends of the first unit and allowing free flow in the second line, and a second position allowing free flow between the ends of the first unit and stopping flow in the second line to the second unit.

2. The machine according to claim 1 wherein said valve means when in said second position allows one-way flow in the second line from the second unit.

3. The machine according to claim 2 wherein the valve means is solenoid actuated and includes a check valve for allowing said one-way flow.

4. The machine according to claim 3 in which the valve means includes a three-way, two-position, solenoid actuated valve and a check valve.

5. The machine according to claim 4 in which the circuit includes a bale size switch arranged on the machine in series with a control switch, the bale size switch being disposed so as to be opened when a growing bale has reached a predetermined size.

6. The machine according to claim 3 in which the valve means comprises a two-way, two-position, solenoid actuated, normally closed valve located in the first line; and a two-way two-position, solenoid actuated, normally open valve located in the second line along with said check valve.

7. The machine according to claim 6 in which the machine has an abutment movable with the chamber as it increases in volume, the abutment being disposed to contact the bale size switch at the said predetermined size to open the switch.

8. The machine according to claim 3 in which the solenoid actuated valve means is in a circuit connected to a control switch adapted for being placed at the operator station of a tractor.

9. The machine according to claim 8 in which the position of the abutment relative to the bale size switch can be adjusted to vary the said predetermined size of the growing bale at which the abutment opens the switch.

10. The machine according to claim 8 in which the position of the abutment relative to the bale size switch can be adjusted to a position in which the abutment does not contact the bale size switch during the formation of the bale.

11. In a large round baler including a tensioning system employing a first two-way hydraulic piston and cylinder unit connected for maintaining tension in belt means defining an expansible bale chamber and employing a second two-way hydraulic piston and cylinder unit connected to a discharge gate for selectively moving the latter between closed and open locations, a first supply/return line having a first branch connected directly to a piston end of the first unit and having a second branch connected to a piston end of the second unit, and a second supply/return line being connected directly to a rod end of the second unit and having a branch connected to a rod end of the first unit by way of a one-way valve permitting flow only in a direction towards the first unit, a first bypass line interconnecting the first and second supply/return lines such that the rod and piston ends of the first unit are placed in fluid communication with each other and an adjustable high pressure relief valve being connected in said first bypass line interconnecting the rod and piston ends of the first unit, the improvement comprising: a second bypass line connected between the first and second supply/return lines in parallel with the first bypass line; bypass valve means connected in said second bypass line; and said valve means being shiftable between a first position blocking fluid communication between the rod and piston end of the first unit by way of the second bypass line while permitting free flow to and from the piston end of the second unit, and a second position establishing fluid communication between the piston and rod ends of said first unit by way of the second bypass line while blocking flow to the piston end of said second unit.

12. The large round baler as defined in claim 11 wherein the valve means is solenoid operated and is normally in said first position when coil means thereof is de-energized and is moved into said second position in response to said coil means becoming energized.

13. The large round baler defined in claim 12 wherein said tensioning system includes a tensioning arm which swings between first and second positions in response to bale core growth; and an electrical circuit connected to said coil means and including a normally closed switch located for being contacted by said tensioning arm when the latter reaches a position corresponding to a desired core diameter.

14. The large round baler defined in claim 11 wherein said valve means includes a two-position, three way valve connected in a part of the second supply/return line leading to the piston ends of the second unit and also connected in said second bypass line; and a shunt line connected to said second supply/return line for shunting flow around said valve and containing a check valve for limiting flow to a direction away from the piston end of the second unit.

15. The large round baler defined in claim 11 wherein said valve means includes first and second, two-position, two-way valves with said first valve being located in said second bypass line and with said second valve being located in a part of the second supply/return line that is connected to the piston end of the second unit; and said first and second valves being simultaneously selectively positioned for establishing a first condition wherein free flow is permitted to the piston end of the second unit while flow is blocked from occurring between the rod and piston ends of the first unit in the direction of the rod end of the first unit and positioned for establishing a second condition wherein free flow is permitted between the rod and piston ends of the first unit while flow in the direction of the piston ends of the second unit is blocked.

* * * * *